US012665443B2

(12) United States Patent
Ruelas

(10) Patent No.: US 12,665,443 B2
(45) Date of Patent: Jun. 23, 2026

(54) SYSTEM AND METHOD FOR PURCHASING WIRELESS BATTERY CHARGE FOR ELECTRONIC DEVICES

(71) Applicant: Jorge Ruelas, Brownsville, TX (US)

(72) Inventor: Jorge Ruelas, Brownsville, TX (US)

( * ) Notice: Subject to any disclaimer, the term of this patent is extended or adjusted under 35 U.S.C. 154(b) by 851 days.

(21) Appl. No.: 17/870,972

(22) Filed: Jul. 22, 2022

(65) Prior Publication Data

US 2023/0023108 A1      Jan. 26, 2023

Related U.S. Application Data

(60) Provisional application No. 63/224,593, filed on Jul. 22, 2021.

(51) Int. Cl.
| | |
|---|---|
| *H02J 50/20* | (2016.01) |
| *G06Q 20/14* | (2012.01) |
| *H02J 50/80* | (2016.01) |
| *H04W 4/24* | (2018.01) |

(52) U.S. Cl.
CPC ............ *H02J 50/20* (2016.02); *G06Q 20/145* (2013.01); *H02J 50/80* (2016.02); *H04W 4/24* (2013.01)

(58) Field of Classification Search
CPC ........ H02J 50/20; H02J 50/80; H02J 2310/23; H02J 50/402; H02J 7/00034; H02J 50/10; H02J 50/90; H02J 50/27; H02J 50/40; H02J 50/50; H02J 50/60; H02J 7/865; H04W 84/18; H04W 12/106; H04W 84/22; H04W 4/38; H04W 4/46; H04W 4/24; B60L 2240/72; B60L 53/53; B60L 53/54; B60L 53/57; B60L 53/65; B60L 53/66; B60L 53/67; G06Q 20/0658; G06Q 20/145; G06Q 20/3224; G06Q 20/3278; G06Q 20/352; G06Q 20/367; G06Q 20/3829; G06Q 20/36; G06Q 20/065; G06Q 20/401; G06Q 20/027
USPC .................................................. 320/106–115
See application file for complete search history.

(56) References Cited

U.S. PATENT DOCUMENTS

| | | | |
|---|---|---|---|
| 2013/0254097 A1* | 9/2013 | Marathe ................ | G07F 15/005 705/35 |
| 2019/0132709 A1* | 5/2019 | Graefe ..................... | H04W 4/46 |
| 2021/0306807 A1* | 9/2021 | Kashani-Nejad ........ | G08B 7/06 |

* cited by examiner

*Primary Examiner* — Binh C Tat

(74) *Attorney, Agent, or Firm* — Brennan, Manna & Diamond, LLC

(57) ABSTRACT

The present invention relates to a smartphone battery wireless charging system and application. The wireless charging application enables customers to purchase battery charge by paying a fee. The requested battery charge is provided wirelessly over-the-air using Wi-Fi by wireless charging base stations or using IoT devices and more. A server determines the battery capacity of the battery of a smartphone and based on the battery charge purchase request, battery charge is transmitted to the smartphone in the form of waves which are received by the smartphone and is converted into electric charge to recharge the battery. A user can pay a fee to receive, for example, 25%, 50%, 75%, or 100% battery charge. The charging of the phone is provided without an external connector thereby enabling individuals to use their phone for extended periods of time without running out of battery charge.

20 Claims, 9 Drawing Sheets

400

SYSTEM AND METHOD FOR PURCHASING WIRELESS BATTERY CHARGE FOR ELECTRONIC DEVICES

CROSS-REFERENCE TO RELATED APPLICATION

The present application claims priority to, and the benefit of, U.S. Provisional Application No. 63/224,593, which was filed on Jul. 22, 2021 and is incorporated herein by reference in its entirety.

FIELD OF THE INVENTION

The present invention relates generally to the field of wireless recharging of smartphone batteries. More specifically, the present invention relates to a computer implemented method and system for customers to purchase a battery charge for their smartphones. The users can purchase 25%, 50%, 75%, or 100% battery charges for immediately and wirelessly recharging their smartphone batteries without using any external connector. A plurality of charging devices in the form of IoT devices, charging base stations, and more are configured to provide battery charge wirelessly to a smartphone for recharging the battery. Accordingly, the present disclosure makes specific reference thereto. Nonetheless, it is to be appreciated that aspects of the present invention are also equally applicable to other like applications, devices, and methods of manufacture.

BACKGROUND

By way of background, handheld electronic devices especially a smartphone allow users to freely enjoy rich contents and multimedia at any time. Smartphones have become a necessity and individuals spend a considerable amount of time using their smartphones. With the advancement of the internet technologies and its applications, smartphones are not only used for making phone calls but also for internet usage such as sending and receiving emails, chatting, sharing photos and documents, reading news, browsing the Internet, and online selling and buying. However, smartphones have a limitation in that the use time is short due to a restricted battery capacity. Battery management is one of the critical issues with smartphones. Over the years there has been substantial improvement in battery management with respect to the basic functionality of making calls. For recharging a smartphone battery, individuals use an external connector in the charging port of a smartphone. A power supply such as an external supply or a power bank is used. However, use of such an external connector is not always possible and available. Individuals may end up with a smartphone without a charged battery.

A situation of the wireless charging technology in the smartphone markets has been developed since 2010, in which the smartphones according to wireless charging has appeared. However, wireless charging requires a charging pad or other charging device that should be in possession of a user of the smartphone for recharging the battery. Individuals desire an improved way of recharging batteries that does not require an external connector such as a USB cable, C-type cable, wireless charging pad, and more. Further, individuals desire a way of charging that enables them to recharge their smartphone batteries virtually anywhere by paying an amount on an ecommerce platform.

Being unable to use GPS, emergency services, and more due to unavailability of the battery power is not only discomforting and frustrating but is also unsafe. Smartphone manufacturers and IoT providers desire a system that enables individuals to recharge smartphone batteries using wireless technologies from IoT devices, charging devices, and more.

Therefore, there exists a long felt need in the art for a method for recharging smartphone batteries wirelessly without use of an external connector. There is also a long felt need in the art for a battery recharging application that enables the customers to easily order a battery charge for their smartphones. Additionally, there is a long felt need in the art for a smartphone battery recharge system that enables smartphone batteries to be recharged using wireless charging device which are in vicinity of the smartphone. Moreover, there is a long felt need in the art for a wireless charging application that enables smartphone to receive over-the-air charging for the battery. Further, there is a long felt need in the art for a smartphone application that enables users to immediately purchase a battery charge by paying a fee. Finally, there is a long felt need in the art for a system that charges the phone without the need for an external charging connector and enabling individuals to use their phone extensively without running out of battery charge.

The subject matter disclosed and claimed herein, in one embodiment thereof, comprises a computer implemented method for providing battery charge wirelessly to a smartphone. The method comprising the steps of receiving a battery charge request from a smartphone wherein the battery charge request includes a request for a percentage of total battery capacity of the smartphone; determining, the total battery capacity of the smartphone; determining, the battery charge corresponding to the battery charge request; providing, the battery charge corresponding to the battery charge request by a charging device wherein the charging device wirelessly transmits battery charge waves to the smartphone; converting the battery charge waves into electric charge for recharging the battery of the smartphone. The battery charge can also be provided by over-the-air through beacons or antennas for recharging the battery without using any external connector.

In this manner, the computer implemented method and associated application of the present invention accomplish all of the forgoing objectives and provide users with a method to purchase a specific battery charge, such as, 25%, 50%, 75%, or 100% battery charges. The method enables individuals to download the application and immediately purchase a battery charge to charge the phone without the need for an external charging connector

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a computer implemented method for providing battery charge wirelessly to a smartphone. The method comprising the steps of receiving a battery charge request from a smartphone wherein the battery charge request is a percentage of total battery capacity of the smartphone; determining, the total battery capacity of the smartphone; determining, the battery charge corresponding to the battery charge request; providing, the battery charge corresponding to the battery charge request by a charging device wherein the charging device wirelessly transmits battery charge waves to the smartphone; converting the battery charge waves into electric charge for recharging the battery of the smartphone.

In yet another embodiment, the method further comprising, storing smartphone information in an electronic device database wherein the smartphone is uniquely identified by an IMEI number; storing charging device information in a charging device database wherein the charging device provides battery charge information to the smartphone.

In yet another embodiment, the computer implemented method further comprising transmitting, by the smartphone, wireless beacons; receiving, by the charging device, transmitted wireless beacons; determining, by the charging device, battery charge requested by the smartphone; transmitting, by the charging device, battery charge waves to the smartphone, wherein the charging device is in physical proximity with the smartphone.

In yet another embodiment, a computer-based method for purchasing 25%, 50%, 75% or 100% battery charge for an electronic device is described. The method includes the steps of registering the electronic device in a battery recharging system; submitting a battery purchase request wherein the request can be for purchasing 25%, 50%, 75%, 100%, or other percent of battery charge; paying a fee for the battery purchase request; providing, by a charging device, the requested battery charge wirelessly to the electronic device without any external connector.

In yet another embodiment, a computer-readable storage medium storing non-transitory computer-executable program instructions, wherein when executed by a computing device, the non-transitory computer-executable program instructions cause a processor of the computing device to perform operations comprising receiving, from a customer, a battery charge request; receiving, from the customer, a payment information for the battery charge request; receiving, from a charging device, a battery charge wirelessly corresponding to the battery charge request.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
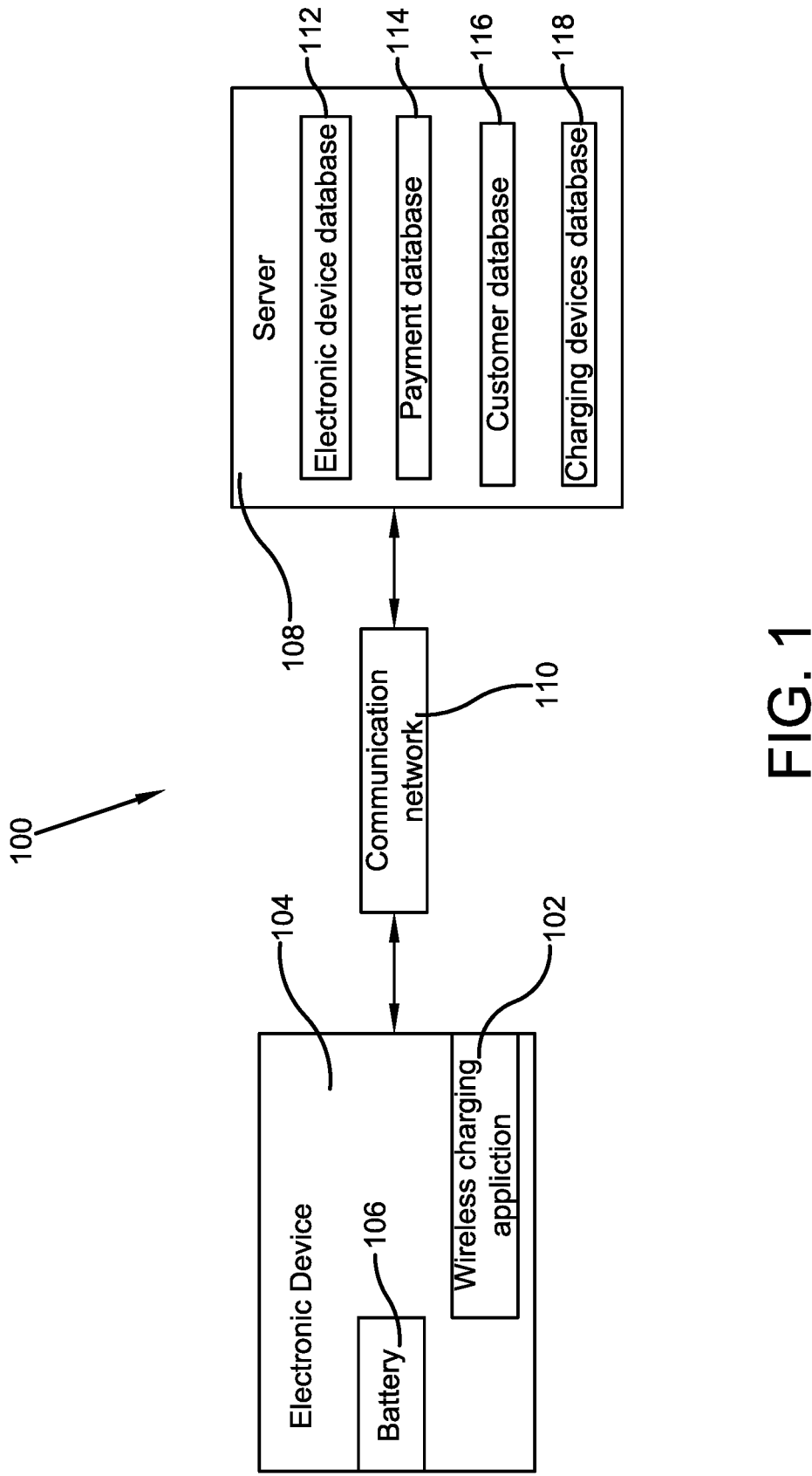
FIG. 1 illustrates a schematic view of a wireless battery recharging system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a method for recharging smartphone batteries wirelessly without use of an external connector. There is also a long felt need in the art for a battery recharging application that enables the customers to easily order a battery charge for their smartphones. Additionally, there is a long felt need in the art for a smartphone battery recharge system that enables smartphone batteries to be recharged using wireless charging device which are in vicinity of the smartphone. Moreover, there is a long felt need in the art for a wireless charging application that enables smartphone to receive over-the-air charging for the battery. Further, there is a long felt need in the art for a smartphone application that enables users to immediately purchase a battery charge by paying a fee. Finally, there is a long felt need in the art for a system that charges the phone without the need for an external charging connector and enabling individuals to use their phone extensively without running out of battery charge.

The present invention, in one exemplary embodiment, is a computer-readable storage medium storing non-transitory computer-executable program instructions, wherein when executed by a computing device, the non-transitory computer-executable program instructions cause a processor of the computing device to perform operations comprising receiving, from a customer, a battery charge request; receiving, from the customer, a payment information for the battery charge request; receiving, from a charging device, a battery charge wirelessly corresponding to the battery charge request.

Referring initially to the drawings, FIG. 1 illustrates a schematic view of the wireless battery recharging system of the present invention in accordance with the disclosed architecture. The wireless recharging system 100 of the present invention is configured to provide users with a system used for wirelessly recharging battery of a personal electronic device such as a smartphone, tablet, and the like. The electronic device can obtain energy over-the-air via Wi-Fi or from charging devices in the vicinity of the electronic device as described later in the disclosure. More specifically, the system 100 is configured to be accessed using a computer implemented wireless charging application 102 which provides a plurality of interfaces, allowing a user of the device 104 in which the application 102 is installed to purchase a specific battery charge for the battery 106 integrated in the device 104. Radio charging is a wireless charging method used to charge items with small batteries and low power requirements, such as watches, heating aids, medical implants, cell phones, and wireless keyboards. Radio waves are already in use to transmit and receive cellular telephone, television, radio, and Wi-Fi signals. One exemplary radio wave comprises the use of mmWave, which are extremely high-frequency radio waves that allow for high precision. In this manner, wireless charging can identify the device that needs charging and send a localized beam of radio waves that transmit electricity, in a way that's vastly superior to lower-frequency waves. Another exemplary method comprises the utilization of 5G signals to transmit radio charging to the identified device. The energy in 5G signals can be turned into a miniaturized power source through antennas. This power can charge phones wirelessly without obstructing the 5G data.

The wireless charging application 102 enables a user to purchase 25%, 50%, 75%, 100%, or other percentages, of battery charges by paying for the charge value using the application 102. The application 102 is configured to be in communication with a wireless charging server 108 using a communication network 110 wherein the server 108 is configured to facilitate recharging of battery 106 of the device using either over-the-air recharging or using a plurality of charging devices.

The server 108 functions as a central controlling system for providing and managing power transfer to the device 104. The server 108 includes an electronic device database 112 configured for storing information such as device name, model number, manufacturer, battery specification, wireless module, and more of electronic devices registered with the system 100. Each electronic device is uniquely identified in the database 112 using an identifying key such as an International Mobile Equipment Identity (IMEI) number. The IMEI number is a unique number that functions as a fingerprint for the device and is unique for each electronic device.

A customer database 114 is configured for storing information such as customer name, address, contact number, email address, and more of the customers registered with the system 100. A customer can be uniquely tagged with one or more IMEI numbers stored in the electronic device database 112. A payment database 116 is configured to store payment information and details of customers of the system 100. The payment database 116 is also configured to store historical battery charge purchases requested by customers and helps in recommending the ideal battery charge value to the customers.

Figure 2:
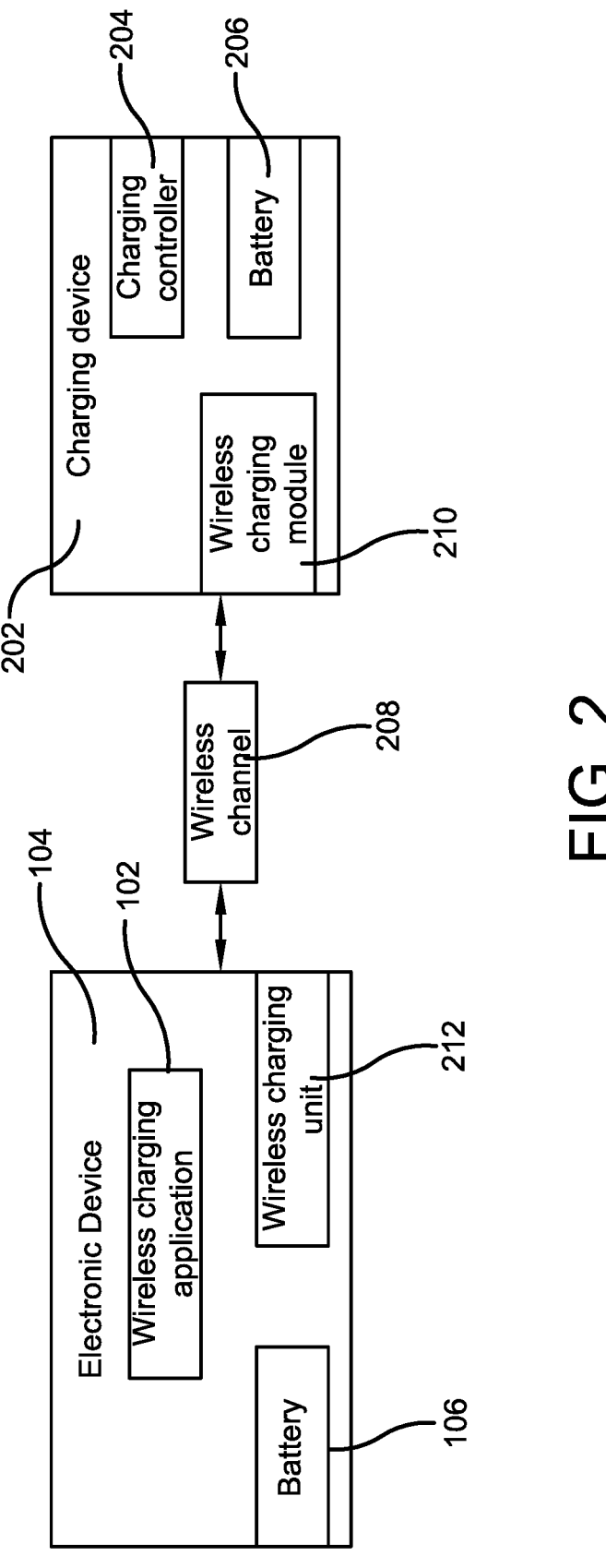
FIG. 2 illustrates a schematic view showing how an electronic device and a charging device are connected to each other allowing the charging device to provide a battery charge in accordance with the disclosed architecture.

A charging device database 118 is configured to store information about a plurality of charging devices that are used for providing battery charge wirelessly to one or more electronic devices as described in FIG. 2. The charging database 118 maintains name and uniquely identifying key of each charging device used in the system of the present invention.

The communication network 110 can be one or more types of wireless communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extend GPRS, code-division multiple access (CDMA), wideband CDMA (WCDMA), CDMA 2000, discrete multi-tone (DMT), Bluetooth (®), global positioning system (GPS), Wi-Fi, ZigBee™ global system for mobile communication (GSM), 2G, 2.5G, 3G, 3.5G, 4G, 5G, 6G, or similar.

The server 108 can be a centralized server, distributed server, cloud server or the like. The server 108 is configured to provide one or more web interfaces, user interfaces and functionality using a plurality of integrated software and hardware modules as described in the present disclosure. It should be noted that the server 108 can be a public, private or hybrid cloud server. For providing necessary functionality, the server 108 can comprise one or more processors (e.g., CPUs or microprocessors), one or more memory units (e.g., RAM, ROM), non-volatile storage systems (e.g., hard disk drive systems), etc. The processor(s) and/or memory unit(s) may be implemented as integrated circuits (ICs).

FIG. 2 illustrates a schematic view showing how an electronic device and a charging device are connected to each other allowing the charging device to provide a battery charge in accordance with the disclosed architecture. The charging device 202 for providing battery charge can be in the form of a charging base station which provides battery charge over-the-air or can be in the form of a car, wireless charging station, smart-charging device and more. It should be noted that the charging device 202 is registered in the system 100 and is configured to provide battery charge wirelessly to one or more electronic devices registered in the system.

More specifically, the charging device 202 has a charging controller 204 for monitoring charging and discharging of battery 206 of the charging device 202. The controller 204 is connected to the server 108 and is configured to verify the electronic device 104 connected to the charging device 202 using a wireless channel 208. The wireless channel is preferably Wi-Fi for over-the-air charging and can also be NFC or IR used for wireless charging. A wireless module 210 which can be in the form of power source resonator or wireless transmitter antenna is used for wirelessly transmitting battery charge in the form of radio waves to the electronic device 104.

A wireless charging unit 212 of the electronic device 104 is configured to receive the transmitted battery charge waves and converts into battery charge for recharging the battery 106 of the electronic device 104. It should be noted that the application 102 is configured to monitor the battery charge of the battery 106 of the electronic device 104 and recommends battery charge purchases using the application 102.

The charging controller 204 of the charging device 202 instructs the charging device 202 to transmit the battery charge request by a user of the device 104. The charging controller 204 receives the value of battery charge along with the electronic device information allowing the charging device 202 to transmit battery charge to the electronic device 104.

Figure 3:
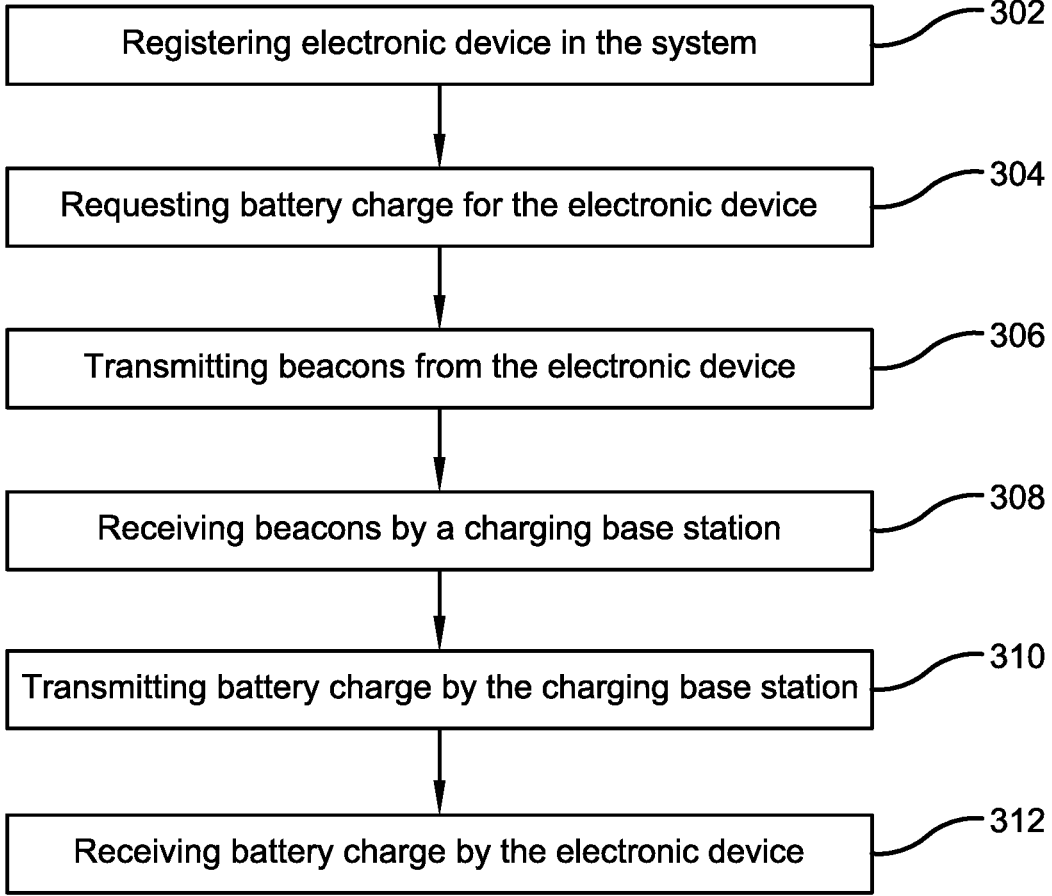
FIG. 3 illustrates a flow diagram depicting an exemplary flow of steps in providing a battery charge wirelessly to an electronic device in accordance with the disclosed architecture.

FIG. 3 illustrates a flow diagram depicting an exemplary flow of steps in providing a battery charge wirelessly to an electronic device in accordance with the disclosed architecture. In the present embodiment, an electronic device is registered in the system so that the electronic device information is stored in the electronic device database (Step 302). Once, the electronic device is registered, a battery charge request is received for the electronic device (Step 304). Once, the battery charge request is successfully submitted and the payment is processed, then wireless beacons or radio waves are transmitted by the electronic device using the wireless charging application (Step 306). The transmitted wireless beacons or radio waves are received by a nearby charging base station which is registered in the system (Step 308).

Once, the beacons or radio waves are received and the identity of the electronic device is verified, the requested battery charge is transmitted in the form of waves through a wireless channel such as Wi-Fi to the electronic device (Step 310). The battery charge waves are received by the electronic device and are converted into electric charge to recharge the battery of the electronic device (Step 312).

Figure 4:
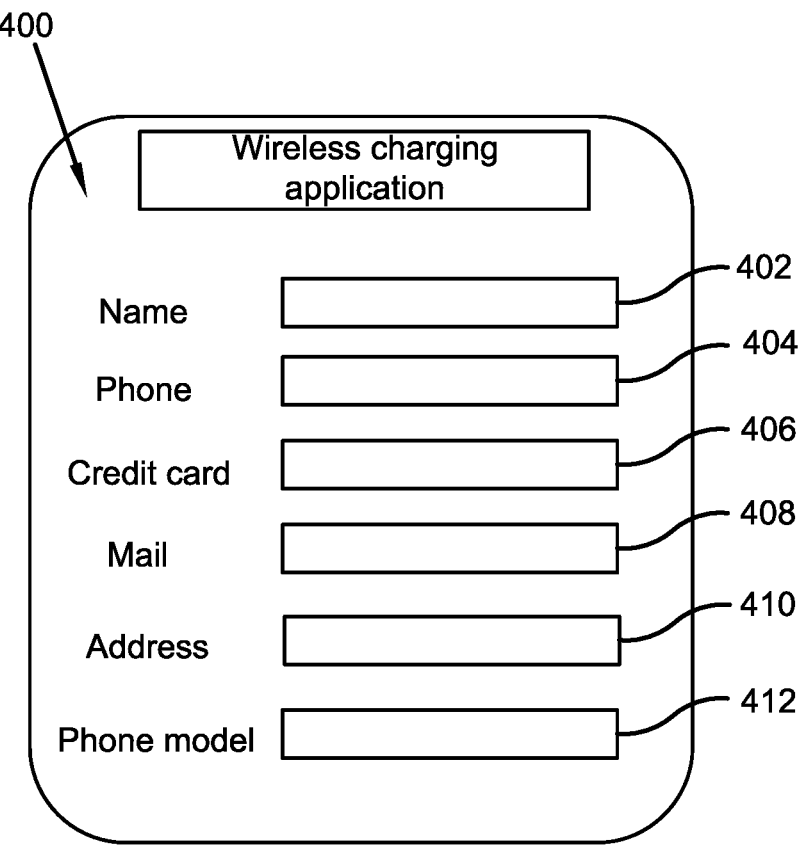
FIG. 4 illustrates an exemplary user interface of the wireless charging application for registering a customer in accordance with the disclosed architecture.

FIG. 4 illustrates an exemplary user interface of the wireless charging application for registering a customer in accordance with the disclosed architecture. The user interface 400 enables a customer to register to the system such that the customer information is stored in the customer database of the server enabling the customer to order or purchase battery charge. The purchased battery charge is provided to the customer without using external connector and can be provided by charging base stations, smart devices, and more. As illustrated, the user interface 400 displays a name box 402 for receiving customer name, a phone box 404 for receiving contact number of the customer, a credit card number box 406 for receiving credit card information allowing payment processing corresponding to the purchased battery charge.

For communication with the customer, an email ID box 408 is provided in which an email ID is received by the system. For verification purposes, address box 410 is provided in which correspondence address of the customer is received. A drop-down menu 412 enables a user to select the phone model that enables the system to identify the power of the battery used in the cell/mobile phone of the user. The battery power is used for automatically calculating a battery charge in "mAh" that is required to be provided to a mobile phone when requested by a customer. The capacity of batteries can be indicated as mAh (milliampere/hour).

Figures 5A, 5B:
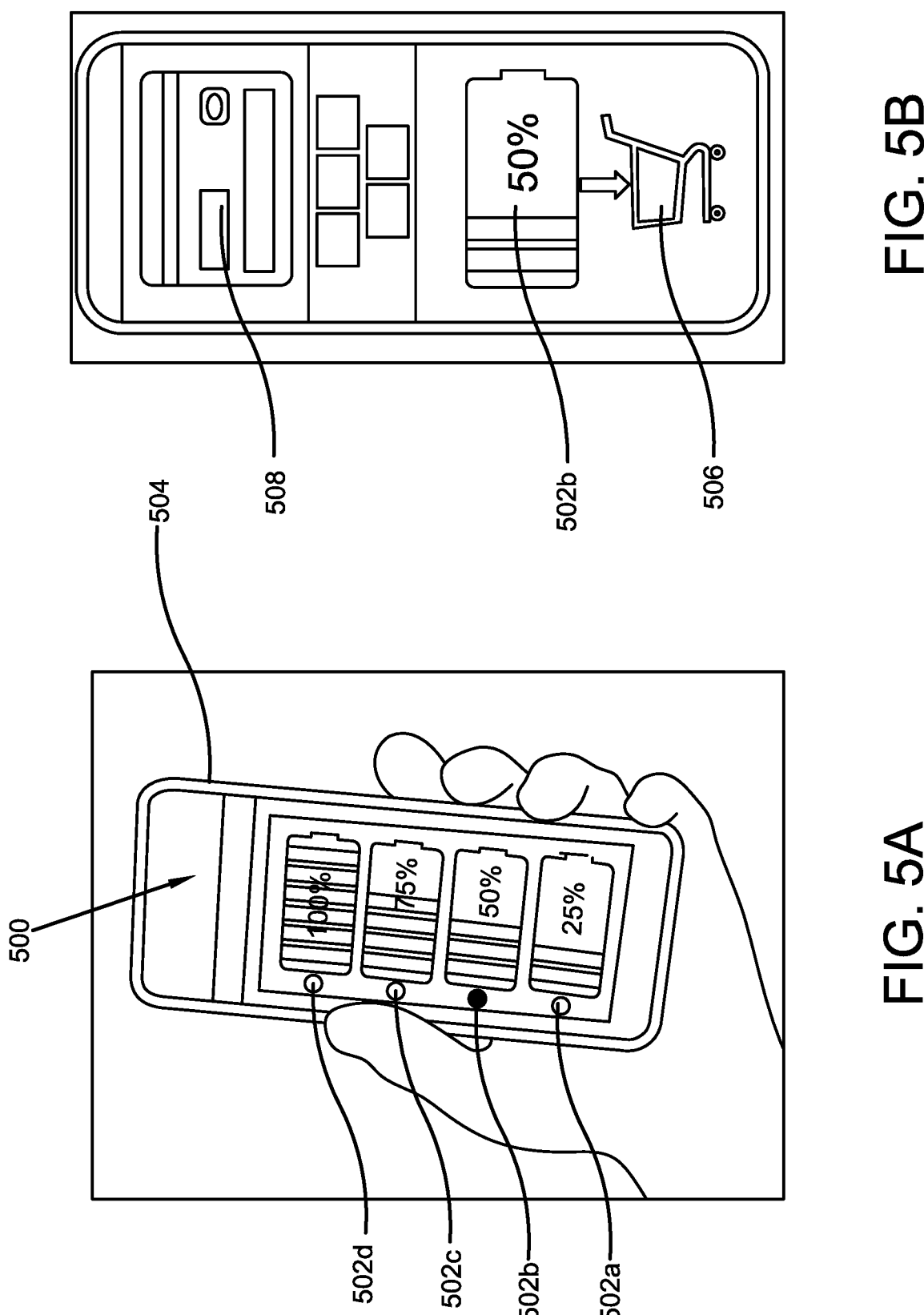
FIGS. 5A and 5B illustrate exemplary user interfaces of the wireless charging application allowing a customer to purchase battery charge in accordance with the disclosed architecture.

FIGS. 5A and 5B illustrate exemplary user interfaces of the wireless charging application allowing a customer to purchase battery charge in accordance with the disclosed architecture. The user interface 500 displays battery charge percentages 502*a-d* that can be purchased by a customer. As illustrated, a registered customer can purchase 25%, 50%, 75%, or 100% battery charge for the electronic device 504 in which the application 102 is installed. It should be noted that the server 108 on receiving a battery charge request from a customer, automatically calculates battery charge to be provided as described in FIG. 4.

After selection of a specific battery charge percentage, the customer proceeds to purchasing the battery charge by adding the battery charge to a cart 506. As illustrated, 50% battery charge 502*b* is selected and purchased by the user and is added to the cart 506. Once a successful payment is done by the customer using the stored credit card 508, the battery charge is purchased and is provided wirelessly to the customer as described earlier in the present disclosure.

Figure 6:
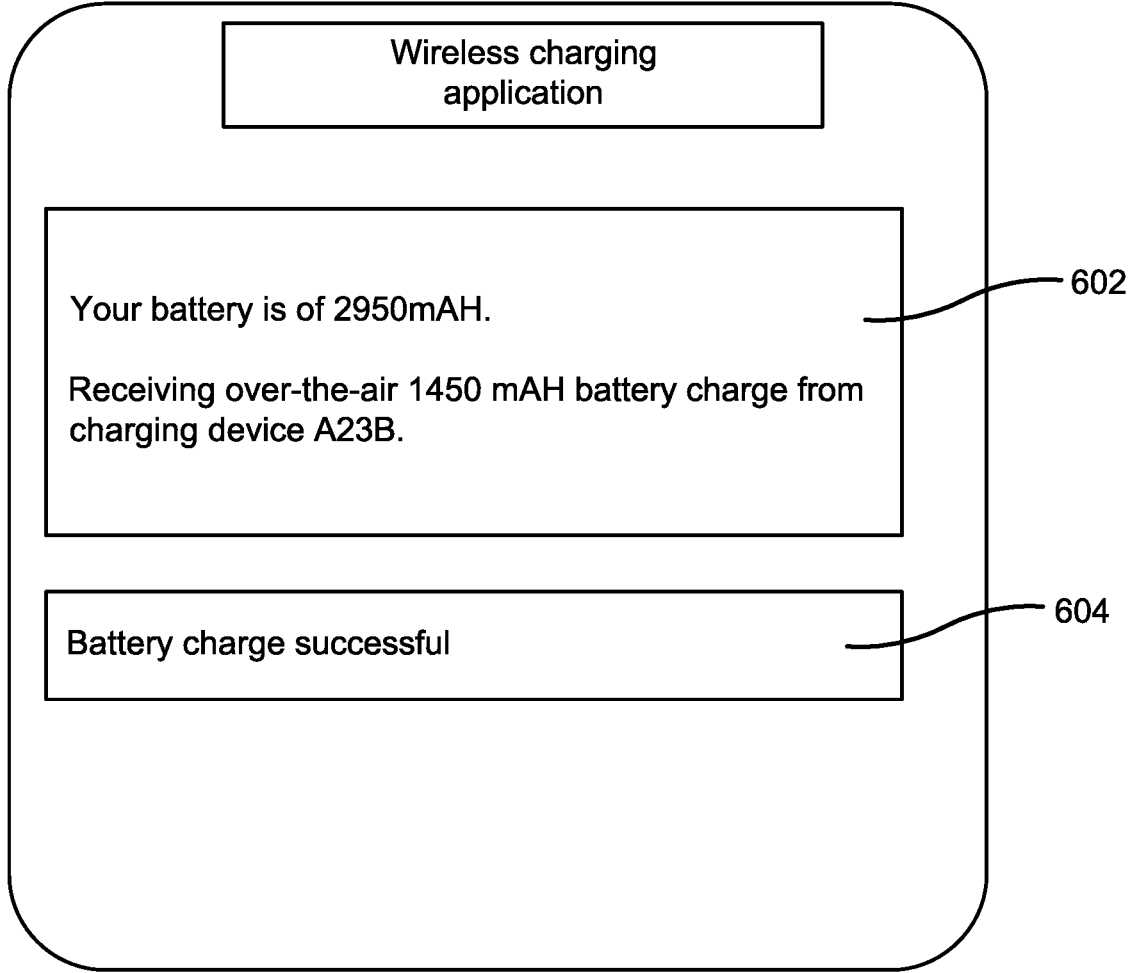
FIG. 6 illustrates exemplary notifications or messages displayed by the wireless charging application of the present invention for notifying a customer about purchased battery charge in accordance with the disclosed architecture.

FIG. 6 illustrates exemplary notifications or messages displayed by the wireless charging application 102 of the present invention for notifying a customer about purchased battery charge in accordance with the disclosed architecture. The wireless charging application 102 and the server 108 are configured to detect the battery capacity of the smartphone in which the application is installed and from which a battery charge purchase request is made. Accordingly, when a battery charge purchase request is made and battery charge is received, the application displays a notification 602 that includes total battery capacity and indication of the battery charge being received by application 102. When, the battery charge is received, a second notification 604 indicating that the battery charge is successful is displayed by the wireless charging application 102.

Figure 7:
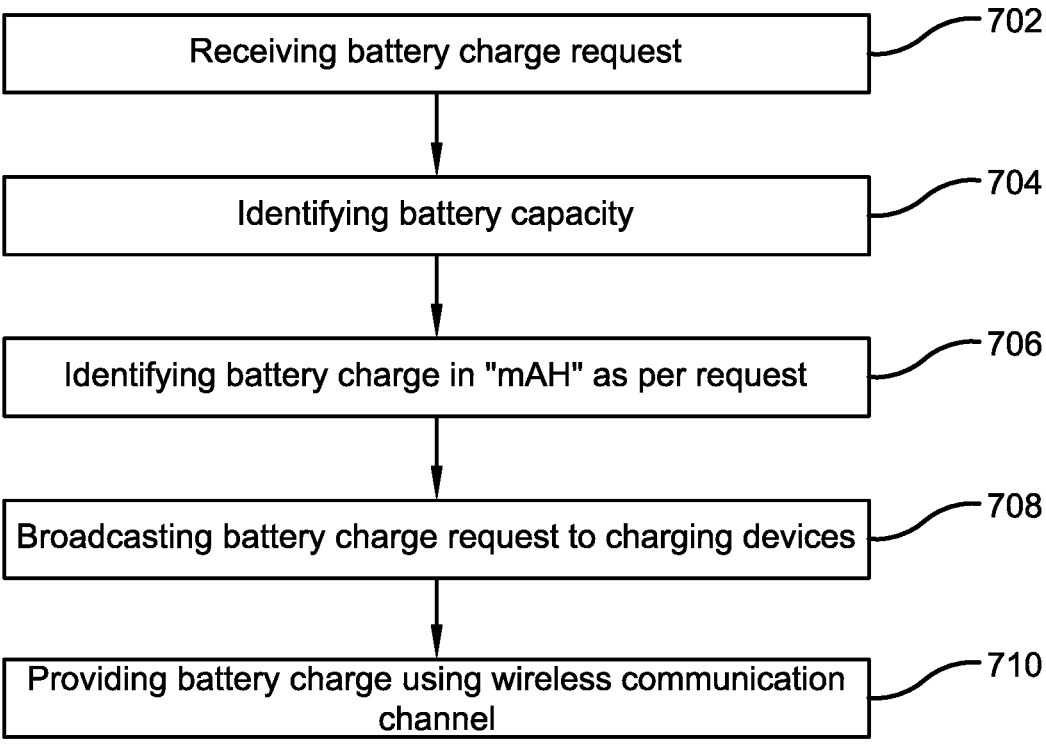
FIG. 7 illustrates a flow diagram depicting another process of wirelessly providing a battery charge to an electronic device using the smartphone application in accordance with the disclosed architecture.

FIG. 7 illustrates a flow diagram depicting another process of wirelessly providing a battery charge to an electronic device using the smartphone application in accordance with the disclosed architecture. Initially, a battery charge request is received by the application and is transferred to the server (Step 702). Using, the model of the smartphone, a battery capacity of the electronic device is determined by the system (Step 704). Based on the battery charge request and the battery capacity, a battery charge to be provided to the smartphone is determined by the system (Step 706). As an example, if a customer requests 50% battery charge and the battery capacity is 2000 mAh, then the system determines that a battery charge of 1000 mAh is required to be wirelessly provided to the smartphone. As discussed above, mAh is a unit that measures (electric) power over time. It is commonly used to measure and calculate the energy capacity of a battery.

Once the battery charge is determined, a battery request is broadcasted to charging devices registered with the system (Step 708). It should be noted that the charging devices who are in vicinity of the current location of the requested device receive the broadcasted message. The charging controller of such charging devices are configured to detect if the electronic device (Smartphone) is in range and accordingly, provides the battery charge wirelessly (Step 710).

It should be appreciated that the charging device can be any wireless smart IoT device, an electric vehicle, a charging base station, and much more. The charging device can be a part of the charging system 100 for providing battery charge wirelessly without use of any external connector. The present invention enables individuals to download the application 102 and immediately purchase a battery charge that can be provided wirelessly by nearby charging devices.

Figure 8:
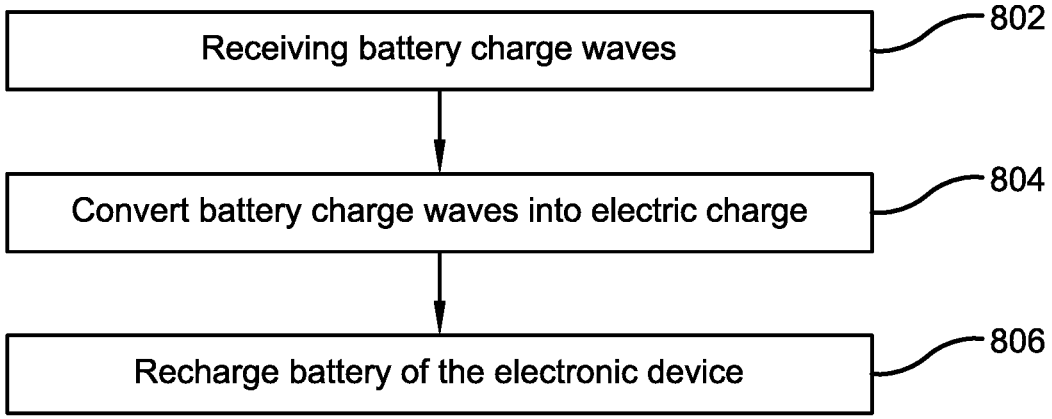
FIG. 8 illustrates a flow diagram depicting the process of recharging the battery using the received battery charge in accordance with the disclosed architecture.

FIG. 8 illustrates a flow diagram depicting process of recharging battery using received battery charge in accordance with the disclosed architecture. Initially, based on the battery charge request, battery charge waves are received by an electronic device (i.e. mobile phone) (Step 802). Using the wireless module of the electronic device and the installed wireless charging application, the battery charge waves are converted into electric charge for recharging the battery of the electronic device (Step 804). Using the converted electric charge, the battery is recharged to a desired level without using external connector (Step 806).

Figure 9:
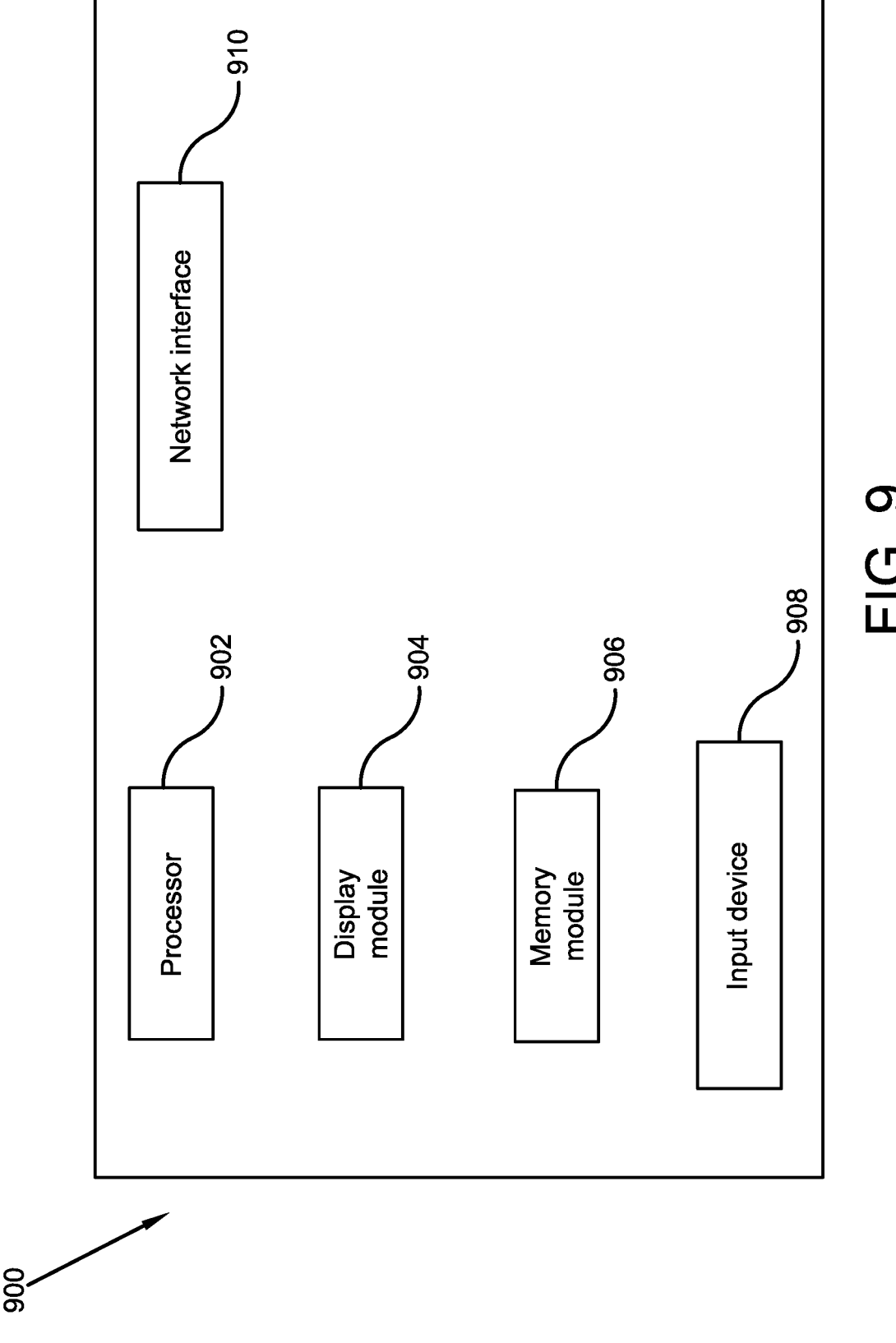
FIG. 9 depicts an example electronic device for implementing the wireless charging application of the present invention in accordance with the disclosed architecture.

FIG. 9 depicts an example computing device for implementing the wireless charging application of the present invention in accordance with the disclosed architecture. The electronic device 900 may be implemented on a handheld device, smart phone, mobile phone and more as described in FIG. 1. The electronic device 900 includes a processor 902 communicatively coupled to one or more memory modules 906. The processor 902 executes computer-executable program code of the rating system application stored in a memory device 906. Examples of the processor 902 include a microprocessor, an application-specific integrated circuit ("ASIC"), a field-programmable gate array ("FPGA"), or any other suitable processing device. The processor 902 can include any number of processing devices or cores, including a single processing device. The functionality of the computing device may be implemented in hardware, software, firmware, or a combination thereof.

The memory module 906 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape, or other magnetic storage, or any other medium from which a processing device can read instructions.

The computing device 900 executes program code that configures the processor 902 to perform one or more of the operations described above. The computing device 900 also includes at least one network interface 910. The network interface 910 includes any device or group of devices suitable for establishing a wired or wireless data connection to one or more data networks. Non-limiting examples of the network interface 910 include an Ethernet network adapter, a modem, or the like.

A display module 904 is configured for displaying user interfaces of the application of the present invention and the input device 908 can be used for submitting input to the application for processing by the processor 902.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "wireless charging system", "wireless battery recharging system", "system", and "battery recharging wireless system" are interchangeable and refer to the battery recharging wireless system 100 of the present invention for sunglasses.

Notwithstanding the forgoing, the battery recharging wireless system 100 of the present invention can be of any suitable size and configuration as is known in the art without affecting the overall concept of the invention, provided that it accomplishes the above stated objectives. One of ordinary skill in the art will appreciate that the battery recharging wireless system 100 as shown in the FIGS. are for illustrative purposes only, and that many other configurations of the battery recharging wireless system 100 are well within the scope of the present disclosure.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in-whole or in-part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments may include devices and/or systems using one or more suitable Operating Systems, for example, Microsoft Windows, Microsoft Windows CE, Microsoft Windows Embedded, Microsoft Windows Mobile, Unix, iOS, Linux, Sun Solaris, Palm OS, J2ME, BREW, an OS used by BlackBerry device(s), or other suitable Operating Systems.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system application for wireless battery charging, the system application comprising:

a computer implemented wireless charging application having a plurality of interfaces;

a user device having a battery and an installed said wireless charging application for purchasing a battery charge;

a communication network;

a server having an electronic device database, a payment database, a customer database, and a charging device database;

a wireless charging source having a wireless charging module and a charging controller for wireless charging of said user device;

wherein the wireless charging application is configured to monitor a charge level of the battery and recommend a purchase of a quantity of battery charge from said wireless charging application based on the charge level;

wherein said user device purchases the quantity of battery charge from said wireless charging application;

wherein said quantity of battery charge transmitted through said communication network to said user device; and wherein the user device is a smartphone and the battery is a smartphone battery.

2. The system application for wireless battery charging of claim 1, wherein said communication network comprises radio waves.

3. The system application for wireless battery charging of claim 2, wherein said radio waves are mmWaves.

4. The system application for wireless battery charging of claim 2, wherein said radio waves comprise 5G signals.

5. The system application for wireless battery charging of claim 2, wherein said quantity of battery charge is a quantity of mAh.

6. The system application for wireless battery charging of claim 2, wherein said quantity of battery charge is a percentage of a battery charge of said user device.

7. The system application for wireless battery charging of claim 2, wherein said electronic device database stores information selected from a group consisting of a device name, a device model number, a device manufacturer, a device battery specification, and a device wireless module of each said electronic device.

8. The system application for wireless battery charging of claim 7, wherein each said electronic device includes a unique IMEI number in said electronic device database.

9. The system application for wireless battery charging of claim 8, wherein said customer database stores information selected from a group consisting of a customer name, a customer address, a customer contact number, a customer email address, and said IMEI number.

10. The system application for wireless battery charging of claim 5, wherein said payment database stores historical information of said quantity of battery charge.

11. A method for wireless battery charging, the method comprising the steps of:

providing a computer implemented wireless charging application having a plurality of interfaces;

registering a user device having a battery and an installed said wireless charging application for purchasing a battery charge;

requesting said battery charge from said user device;

transmitting said request for said battery charge over a wireless communication network;

receiving said request for said battery charge by a charging base station;

transmitting said battery charge by said charging base station over said wireless communication network; and receiving said battery charge by said user device; and wherein the user device is a smartphone and the battery is a smartphone battery; and wherein the wireless charging application is configured to display a first notification that includes a total capacity of the battery and a second notification indicating a successful completion of the battery charge.

12. The method of claim 11, wherein said wireless charging application having a server comprising an electronic device database, a payment database, a customer database, and a charging device database.

13. The method of claim 12, further comprising the step of purchasing a specified quantity of said battery charge from said wireless charging application.

14. The method of claim 13, wherein said communication network comprises radio waves.

15. The method of claim 14, wherein said radio waves are mmWaves.

16. The method of claim 14, wherein said radio waves comprise 5G signals.

17. The method of claim 14, wherein said quantity of battery charge is a quantity of mAh.

18. The method of claim 14, wherein said quantity of battery charge is a percentage of a battery charge of said user device.

19. A method for wireless battery charging, the method comprising the steps of:

providing a computer implemented wireless charging application having a plurality of interfaces;

registering a user device having a battery and an installed said wireless charging application for purchasing a battery charge;

requesting a specified quantity of said battery charge from said user device;

purchasing said specified quantity of said battery charge;

transmitting said request for said specified quantity of said battery charge over a wireless communication network;

receiving said request for said specified quantity of said battery charge by a charging base station;

transmitting said specified quantity of said battery charge by said charging base station over said wireless communication network; and receiving said specified quantity of said battery charge by said user device;

wherein the user device is a smartphone and the battery is a smartphone battery;

wherein the wireless charging application is configured to recommend a purchase of the specified quantity of battery charge from said wireless charging application based on a current charge level; and wherein the wireless charging application is configured to display a notification indicating a successful completion of the battery charge.

20. The method of claim 19, wherein said specified quantity of said battery charge is a quantity selected from a quantity of mAh and a percentage of a battery charge of said user device.

* * * * *